United States Patent [19]

Phillips, II

[11] Patent Number: 4,733,834
[45] Date of Patent: Mar. 29, 1988

[54] DEICER CONTROL SYSTEM

[75] Inventor: Ronald W. Phillips, II, Mogadore, Ohio

[73] Assignee: The B. F. Goodrich Company, Akron, Ohio

[21] Appl. No.: 832,187

[22] Filed: Feb. 24, 1986

[51] Int. Cl.[4] .............................................. B64D 15/00
[52] U.S. Cl. ........................... 244/134 R; 244/134 A
[58] Field of Search ............ 244/134 A, 134 R, 134 D

[56] References Cited

U.S. PATENT DOCUMENTS

| | | | |
|---|---|---|---|
| 2,217,299 | 10/1940 | Taylor | 244/134 A |
| 2,422,624 | 6/1947 | Hunter | 244/134 A |
| 2,515,519 | 7/1950 | Lawrence et al. | 244/134 A |
| 2,912,190 | 11/1959 | MacDonough | 244/134 A |
| 2,934,288 | 4/1960 | MacIntyre | 244/134 R |
| 3,263,702 | 8/1966 | Pallen et al. | 244/134 R |
| 3,693,916 | 9/1972 | Tritt et al. | 244/134 A |
| 3,704,720 | 12/1972 | Kaiser | 244/134 A |
| 3,720,388 | 3/1973 | Kaatz et al. | 244/134 A |

Primary Examiner—Joseph F. Peters, Jr.
Assistant Examiner—Lynn M. Fiorito
Attorney, Agent, or Firm—Joseph Januszkiewicz

[57] ABSTRACT

A deicer control circuit wherein a pressurized air source is connected to control valves and a regulating valve. Such regulating valve has a vacuum line output line that is also connected to such control valves. The control valves, on actuation by a timer, will sequence the pressure line and the vacuum line to alternately inflate and deflate the deicer units. The control valves also provide a sealing off or locking in of the pressurized deicer units in this sequence in response to a pressure sensor.

6 Claims, 5 Drawing Figures

DEICER CONTROL SYSTEM

BACKGROUND OF THE INVENTION

This invention relates to a control system for removing an ice film from the aircraft's wings.

Under certain atmospheric conditions, ice is formed and accumulates on the leading edges of an aircraft wing or airfoils, and because of the adverse effects of added weight and its change on the effective shape of an airfoil surface, it is necessary to provide effective means to remove ice formations and its accumulation on the airfoils of airplanes.

The present invention provides a novel and simplified control circuit for the effective control of using pneumatic deicers in removing ice formation and accumulation from airfoils. The invention utilizes a simplified means for alternately applying a vacuum and pressure to the deicer units. Such units operate on a minimum of compressed air regardless of pressure and provides the additional advantage of large flow capacity with no moving parts continuously exposed to hot gases and with less contaminant sensitivity.

SUMMARY OF THE INVENTION

The invention is directed to a system for controlling the inflation of deicer units in response to a timer switch which utilizes a regulating valve that receives a steady pressurized air source which provides a vacuum to such regulating valve. Such pressurized air source and vacuum is alternately supplied to the deicer units as controlled by solenoid operated valves and a pressure sensor operated switch. In addition, the cooperative valves and switch provide means for locking in or sealing off the deicer units when pressurized.

DETAILED DESCRIPTION

Figure 1:
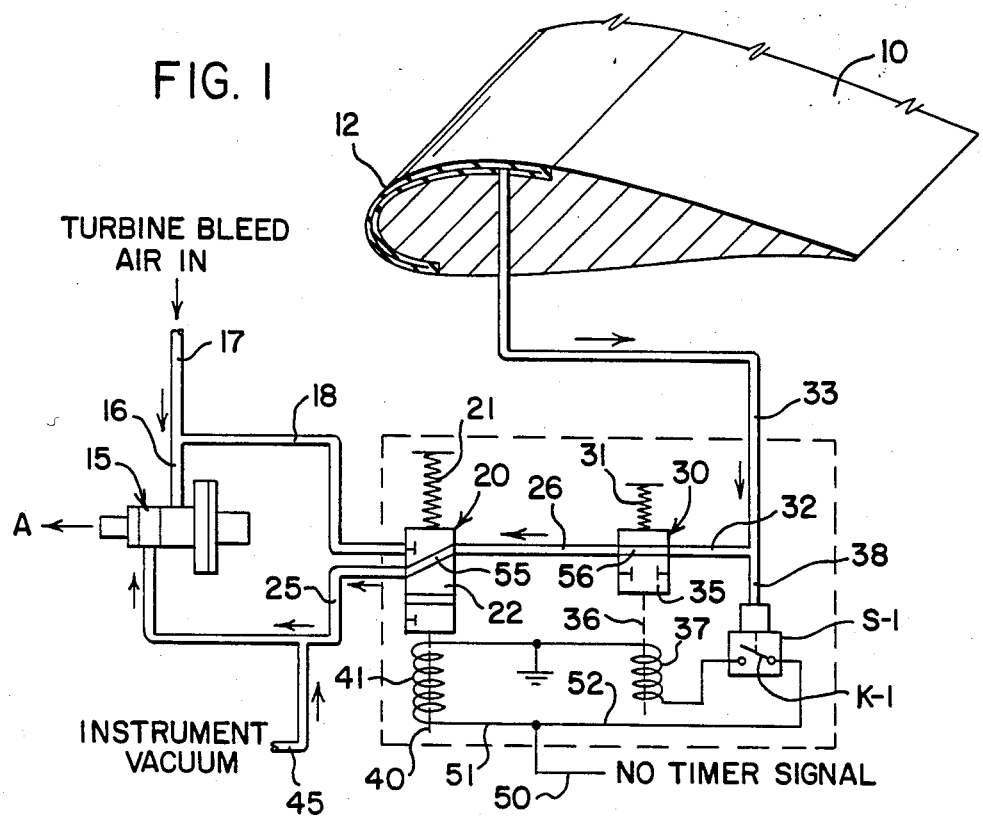
FIG. 1 is a diagrammatic view of a portion of an airplane's wing with a deicer pad and the control circuit set for pulling a vacuum on the deicer pad.

Referring to the drawings wherein like reference numerals designate like or corresponding parts throughout the several views, there is shown in FIG. 1 a portion of an airplane's wing 10 having a leading edge upon which is mounted a plurality of inflatable members of which only a portion of one is shown as at 12. Inflatable member 12 comprises an extensible flexible and elastic structure of rubber or rubber-like material reinforced with fabric and may have inflatable tubes therein or are sewn to contain passageways which are distensible to break up the ice accumulated on the deicer pad.

Figure 2:
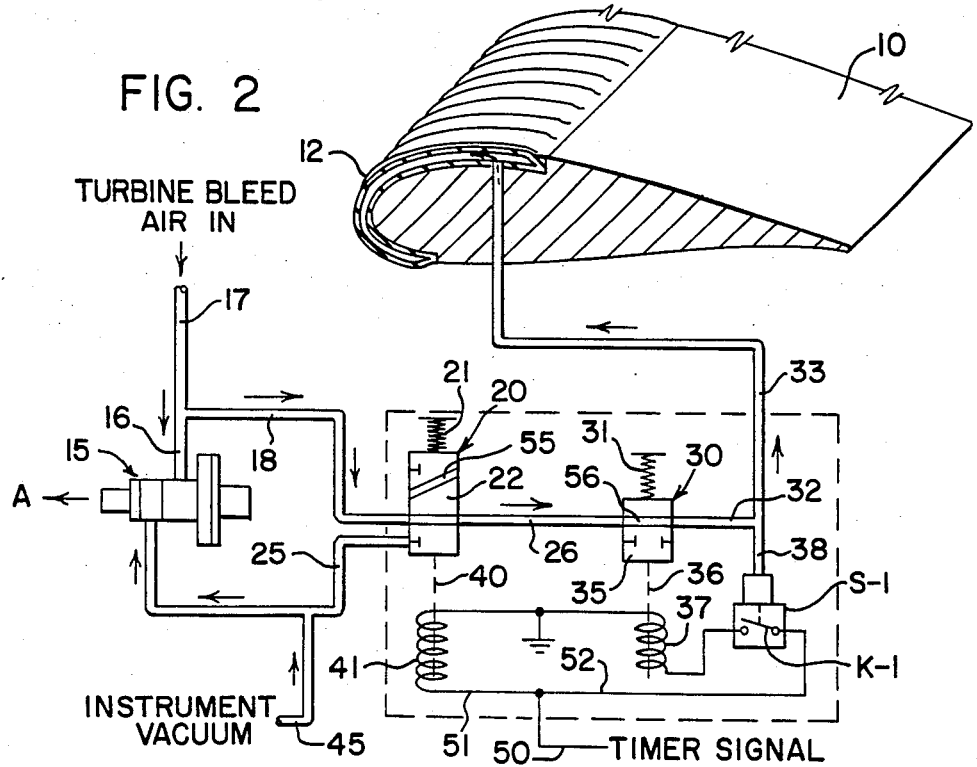
FIG. 2 is a diagrammatic view of a portion of an airplane's wing with a deicer pad thereon and the control circuit set for inflating the inflatable tubes in the deicer pad.
Figure 3:
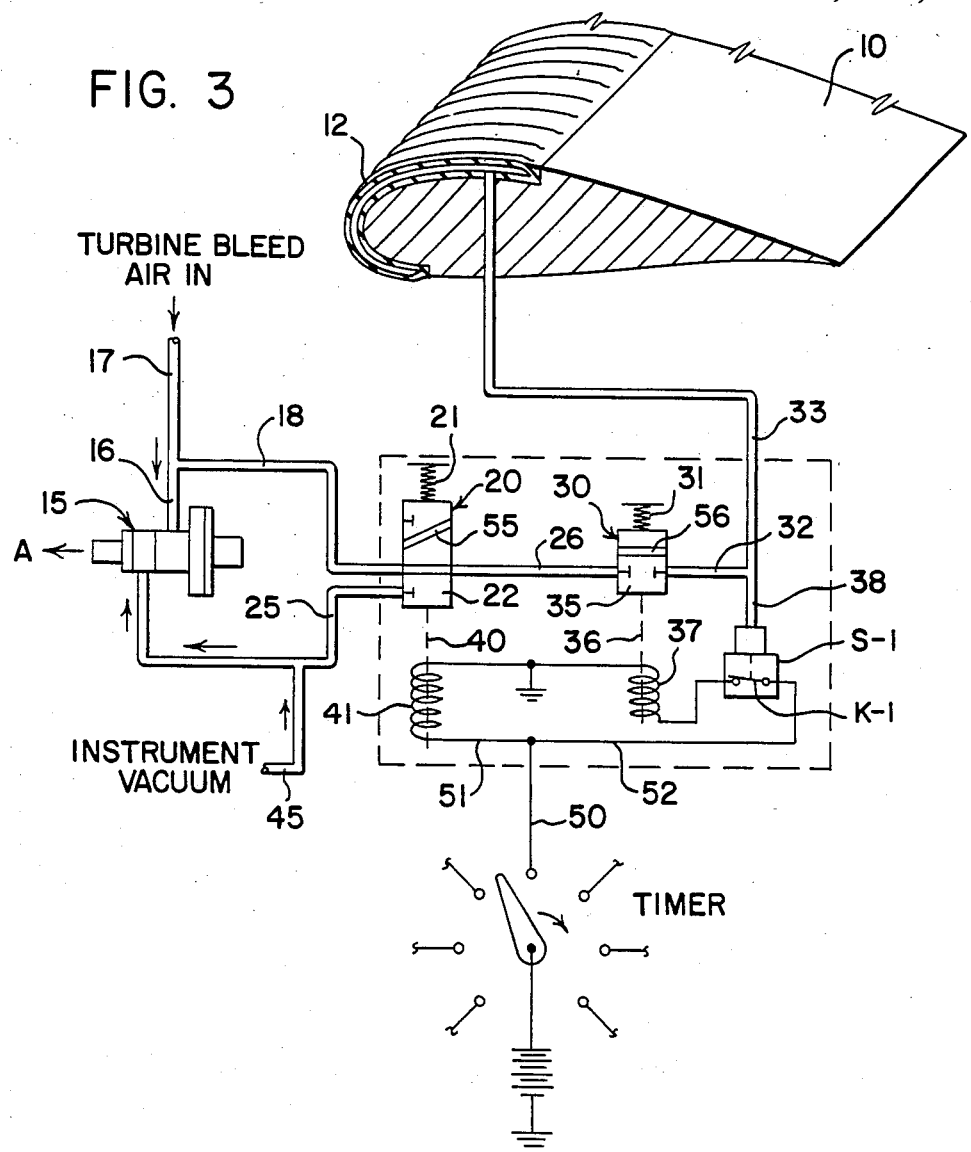
FIG. 3 is a diagrammatic view of a portion of an airplane's wing with a deicer pad thereon and the control circuit set for sealing off the pressurized tubes in the deicer pad.

A self-regulating vacuum valve 15 to be described has a conduit 16 connected thereto which in turn is connected to conduit 17 which delivers pressurized air thereto as from a bleed off from a turbine. A branch conduit 18 having one end connected to conduit 17 has its other end connected to solenoid operated valve 20. In the normal position, solenoid operated valve 20 is biased by spring 21 such that its moveable spool designated 22 in FIG. 1 interconnects conduit 25 with conduit 26 while blocking connection to conduit 18. Conduit 25 is connected to vacuum valve 15 which pulls a vacuum in conduit 25 as well as conduit 26. Solenoid operated valve 30, biased by spring 31, interconnects conduit 26 with conduit 32 and main conduit 33 which in turn is connected to inflatable member 12. As shown in FIG. 1, the vacuum pulled in line 25 has a direct connection to the inflatable member 12 and maintains the deicer pad in a deflated condition. The spool of solenoid operated valve 30 is designated 35 and in the normal position has its plunger 36 in a downwardly disposed position as shown in FIG. 2, and when solenoid 37 is energized, plunger 36 is moved upwardly as depicted by FIG. 3 to disconnect the flow of pressurized fluid from conduit 26 to conduit 32. As seen in FIG. 3, pressure switch S-1 is connected to conduit 33 via conduit 38 which maintains a pressure in the inflatable tubes 12 and whenever sufficient pressure is built up in the inflatable tubes 12, such pressure actuates pressure switch S-1 which then closes contact K-1 which then energizes solenoid 37 and pulls plunger 36 up to interrupt the flow of pressurized fluid to the inflatable tubes 12 and seals off any back flow of such pressurized air to maintain the inflatable tubes of the deicer in an inflated condition.

The solenoid operated valve 20 has a plunger 40 moveable upon energization of solenoid 41 upwardly to the position shown in FIG. 2 whereby pressurized fluid from conduit 18 will be connected to conduit 26 which will then pressurize inflatable tubes 12 assuming solenoid operated valve 30 is de-energized. As seen in FIG. 2, this condition exists when the pressurized fluids in line 33 have not fully inflated the inflatable tubes 12 and pressure switch S-1 is not activated.

A branch conduit 45 is connected to an instrument gauge to indicate numerically the amount of vacuum pulled in standard units of measurement. Such branch conduit 45 is connected to conduit 25 which is connected to vacuum valve 15. The arrow A from vacuum valve 15 depicts the discharge of air or high pressure fluids from conduit 16 to atmosphere.

To control the energization and de-energization of the respective solenoid operated valves 20 and 30 and their respective solenoids 41 and 37, a suitable timer, upon actuation by an operator, will make contact at the pre-set time intervals with electric line 50 which branches into two lines 51 and 52. Line 51 will energize solenoid 41 while line 52 will energize solenoid 37 provided switch K-1 is closed. A diagrammatic showing of a timer for multiple deicers is shown in FIG. 3. Such figure depicts a central timing mechanism that has plural taps that control several solenoids that can be operated in timed relation whereas only one deicer unit was described. The length or intervals can be controlled as desired in a manner old and well known in the art.

Assuming that the control circuit is off, a low volume of pressurized air which is bled off from the turbine via conduit 17 to self-regulating valve 15 which (1) provides a suction on conduit 25 and (2) discharges the pressurized air therefrom as indicated by arrow A. Since solenoid operated valves 20 and 30 are in their normal de-actuated mode, passageway 55 in spool 22 of valve 20 and passageway 56 in spool 35 of valve 30 connect conduit 25 via conduits 26, 32 and 33 to the inflatable tubes 12 of the deicer pads, and since a vacuum is pulled therein, the deicer pad will be maintained in a deflated condition providing for a smooth flow of air over the wing 10 of the aircraft. Pressure sensitive switch S-1 is in inoperative condition and, accordingly, contact K-1 remains open. Upon actuation of the timer switch by an operator to place the deicer controls into operation, the timer switch will, upon the preset time, send an electrical current via line 51 to energize solenoid 41 which then pulls plunger upwardly into the position shown in FIG. 2 to thereby disconnect the vacuum pull on the inflatable tubes 12 in the deicer pad and connect such tubes 12 via lines 33, 26 and 18 to the pressurized line 17 which inflates the tubes 12 of the deicer pad. Until sufficient pressure is built up into pressure sensitive switch S-1, contact K-1 will remain open and solenoid 37 remains de-energized.

Upon sufficient pressure built up into the conduit 33 and the inflatable tubes 12, pressure sensitive switch S-1 will actuate contact switch S-1 and close contact K-1 which will then allow electric current to energize solenoid 37 via lines 50 and 52. Upon energization of solenoid 37, plunger 36 will be moved up into the position shown in FIG. 3 whereby passageway 56 in spool 35 of solenoid operated valve 30 will seal off the pressurized air trapped in inflatable tubes 12 and thus maintain the deicer in a position to break the ice accumulated thereon. When the timer interrupts the current flow to both solenoids 41 and 37, the spools 22 and 35 of solenoid operated valves 20 and 30, respectively, will return to the position shown in FIG. 1 whereby the inflatable tubes 12 will be connected to a vacuum pull and the pressurized air from conduit 17 will be directed via self-regulating valve 15 to atmosphere while maintaining a vacuum pull on conduit 25 which maintains a vacuum pull on the deicers.

Figure 4:
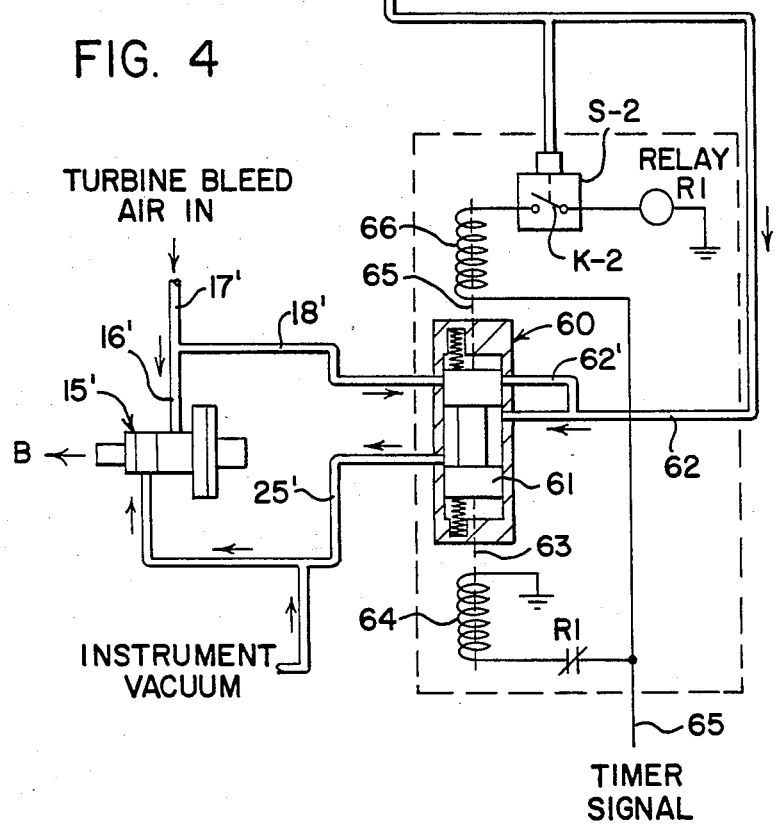
FIG. 4 is a diagrammatic view of a modified form of control circuit for a deicer pad.

A modification of the described embodiment is shown in FIG. 4 wherein a single solenoid operated valve is employed in lieu of the two valves. Inflatable member 12' is identical to deicer unit 12 and self-regulating valve 15' is identical to self-regulating valve 15 previously described and to be described in detail hereinafter. Valve 15' has a conduit 16' connected thereto which is connected to conduit 17' and the pressure source, such as the bleed off from a turbine engine. A branch conduit 18' has one end connected to conduit 17' and its other end to a solenoid operated valve 60. Conduit 25' from valve 60 is connected to valve 15' which draws a vacuum on conduit 25'. The spool 61 of valve 60 is shown in a position which blocks conduit 18' while conduit 25' is connected to conduit 62 which connects valve 60 to inflatable member 12'.

The spool 61 of solenoid operated valve 60 has a plunger 63 subject to being pulled downwardly as viewed in FIG. 4 by energization of solenoid 64 as well as a plunger 65 which is subject to being pulled upwardly as viewed in FIG. 4 by energization of coil 66 provided contact K-2 is closed when pressure switch S-2 is actuated whenever sufficient pressure is built up in the inflatable tubes 12'.

In the operation of the above described embodiment, assuming that the control circuit is off, a low volume of pressurized air is bled off from the turbine via conduit 17' to self-regulating valve 15' which provides a steady suction on conduit 25' and discharges such pressurized air therefrom as indicated by arrow B. The spool 61 of valve 60 connects suction line 25' with line 62 which maintains a vacuum on the deicer tubes or inflatable 0 members 12'. When the operator actuates a timer for the operation of the deicer unit, line 65 will be energized by such timer which energizes solenoid 64 to pull plunger 63 downwardly thereby interconnecting pressurized conduit 18' with branch conduit 62' which pressurizes inflatable member 12 while spool 61 blocks conduit 25'. Upon sufficient pressure built up on the inflatable member 12', pressure sensitive switch S-2 will close contacts K-2 which then allows line 65 to energize relay $R^1$ which opens closed contact $R^1$ thereby pulling spool 61 upwardly to close off conduits 18' and 25' with conduit 62 and sealing off the inflated member 12' until the timer circuit de-energizes line 65 and solenoids 66 (with solenoid 64 already de-energized).

The self-regulating control valve 15 is described with reference to the first embodiment although its functional use is identical for use in the modification shown in FIG. 4. Control valve 15 has a housing 70 with a central bore 71 communicating with a large diameter central bore 72 coaxially therewith. The one end of housing 70 has a flanged portion 75 that cooperates with a flanged portion 76 of a second housing 77 to define a chamber that is divided into a first chamber 79 and a second chamber 80 by the clamping action of such flanges when a circular diaphragm 81 is inserted therebetween. The diaphragm 81 is suitably attached to a rigid annular shaped piston 82 whose central bore portion suitably receives a sleeve 83 that captively receives such diaphragm 81 and piston 82 for movement therewith. Sleeve 83 has a stepped central bore with a threaded intermediate portion 85, an enlarged bore portion 86 at one end and a reduced bore portion 87 at the other end. A threaded plug 88 is suitably threadedly connected to the intermediate threaded bore portion 85 within sleeve 83. The one end of plug 88 is in abutting engagement with a stem 89 of a needle valve 90 received within central bore 71 of housing 70.

Figure 5:
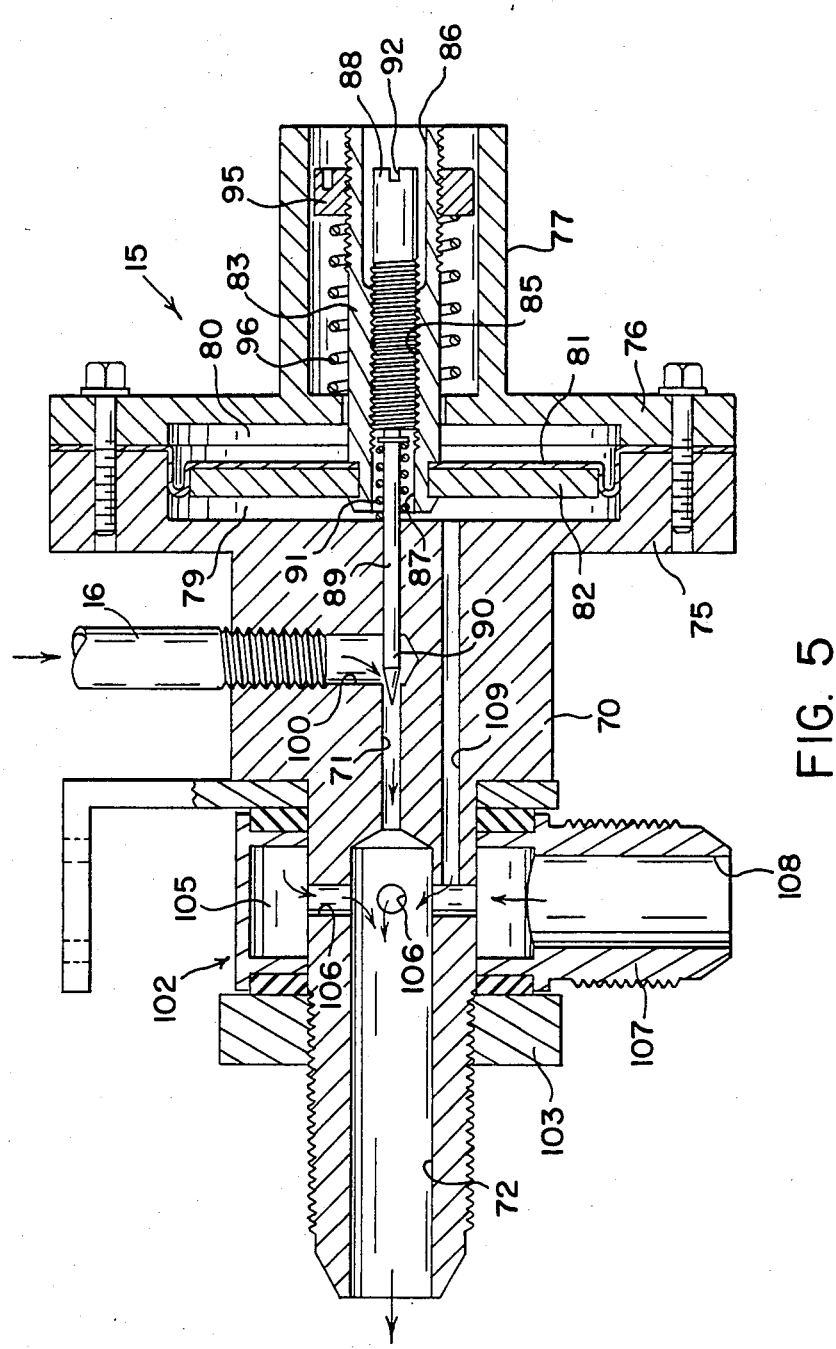
FIG. 5 is a cross sectional view of the control valve for regulating the vacuum.

A compression spring 91 captively 5 encompasses the stem 89 of needle valve 90 and urges needle valve 90 rightwardly as viewed in FIG. 5 for engagement with the plug 88 for a purpose to be described. One end of spring 91 engages the sidewall in first chamber 79 on flange 75 while the other end of spring 91 engages a washer on the stem 89. Plug 88 has a slot 92 to provide means for adjusting the compression on spring 91 by moving such plug axially in view of its threaded connection within sleeve 83. The exterior one end of sleeve 83 has an annular disc 95 threadedly mounted thereon to engage one end of a compression spring 96 that encompasses the intermediate portion of sleeve 83. The other end of compression spring 96 is seated on the flanged portion 76 thus urging diaphragm 81 and piston 82 rightwardly as viewed in FIG. 5 along with plug 88. Chamber 80 is connected to atmosphere via a clearance space past sleeve 83 and the clearance space around the periphery of annular disc 95 in the central bore of housing 77.

The intermediate portion of cylindrical housing 70 has a bore 100 that communicates with central bore 71 adjacent needle valve 90. The upper portion of bore 100 is threaded to receive the one end of conduit 16 which, as previously described, is connected to a high pressure source of air, as bleeding off a small portion of pressurized air from a turbine.

Mounted on the other end of housing 70 is an annular housing 102 which is held in place thereon by a threaded collar 103. Collar 103 is threaded onto the external threads on such other end portion of housing 70. Annular housing 102 has an annular chamber 105 in cooperation with cylindrical housing 70, which chamber 105 is connected via a plurality of circumferentially spaced bores 106 to the enlarged central bore 72. The lower end portion of annular housing 102 has a depending tubular portion 107 threaded exteriorly for connection to conduit 25 and having a central bore 108 for communication with one of the circumferentially spaced bores 106. Elongated cylindrical housing 70 has a passageway 109 parallel to the central bore 71 for interconnecting chamber 79 with one of the bores 106 of the circumferentially spaced bores 106 in annular housing 102.

In the operation of the above described self-regulating control valve 15, a small stream of high pressurized air is bled off from a turbine and directed via conduit 16 through bore 100 in the intermediate portion of housing 102 past needle valve 90 for passage into central bore 71 and thence into passageway or bore 72 for discharge into the atmosphere. As such high pressurized air flows past bores 106 in annular housing 102, a vacuum is drawn or pulled from such plural bores 106 as well as from passageway 109 and bore 108. Bore 108 is connected via conduit 25 and control valve 20 to maintain a vacuum on the deicer pads as desired or to appropriate vacuum instruments. Passageway 109 is connected to chamber 79 thereby exerting a vacuum force on piston 82 and diaphragm 81, which force is opposed by springs 91 and 96. As the vacuum increases in proportion to the opposing forces of springs 91 and 96 and overcoming these spring forces, needle valve 90 will move leftwardly as viewed in FIG. 5 to decrease the amount of pressurized air flowing into central bore 71 from high pressure line 16, thereby decreasing the flow of high pressurized air past bores 106 which in turn decrease the vacuum pull on bores 106, which in turn decrease the vacuum in chamber 79. This action will cause the forces of springs 91 and 96 to move diaphragm 81 rightwardly as viewed in FIG. 5 which in turn will move needle valve 90 away from its restricting effect on the flow of highly pressurized air from bore 100 thus equalizing the forces on diaphragm 81. The amount of the vacuum forces can be adjusted for a given valve by the rotation of plug 88 in sleeve 83 to adjust the valve on spring 91 or to rotate disc 95 to adjust sleeve 83 and diaphragm 81 along with the position of needle valve 90 in central bore 71.

It will be apparent that, although a specific embodiment and certain modifications of the invention have been described in detail, the invention is not limited to the specifically illustrated and described constructions, since variations may be made without departing from the principles of the invention.

I claim:

1. A system for controlling inflatable units for deicers comprising inflatable units that are operative upon flexing to break ice accumulated thereon
    a suction regulating valve, a suction line connected to said regulating valve,
    a pressure source connected to said regulating valve for creating a suction in said suction line,
    valve means operative for interconnecting said suction line and said pressure source to said inflatable units for controlling the condition of said inflatable units, said valve means operative in a first mode for maintaining a vacuum on said inflatable units, said valve means operative in a second mode for maintaining a continuous flow of pressurized air to said inflatable units, and said valve means operative in a third mode for locking said inflatable units in a distended condition without the further flow of pressurized air thereto.

2. A system for controlling inflatable units as set forth in claim 1 wherein said valve means is placed in said third mode by a pressure sensor that is energized by said inflatable unit being inflated to a preset maximum pressure.

3. A system for controlling inflatable units as set forth in claim 1 wherein said valve means is placed in operative position for said last two modes by energization of said valve means.

4. A system for the controlling of the inflation and deflation of inflatable units comprising inflatable units, a regulating valve,
    a suction line interconnecting said regulating valves to a first solenoid operated valve,
    a pressure source connected to said regulating valve for creating a vacuum in said suction line, said pressure source having a branch line connected to said first solenoid operated valve,
    a second solenoid operated valve interconnecting said first solenoid valve to said inflatable units, said solenoid valves being biased in the normal de-energized condition to maintain a direct connection between said suction line and said inflatable units,
    said first solenoid operated valve is operative in an energized condition to interconnect said branch line with said second valve to pressurize said inflatable units,
    and wherein a pressure sensor is operative in response to a preset pressure in said inflatable units to lock said inflatable units at said preset pressure.

5. A system for controlling of inflation and deflation of inflatable units as set forth in claim 4 wherein said pressure sensor is operative at said preset pressure to condition said second solenoid operated valve to block said inflatable units at said preset pressure to maintain said units pressurized.

6. A system for the controlling of inflation and deflation of inflatable units as set forth in claim 5 wherein said solenoid operated valves are operative in response to a timer that is selectively actuated for operation.

* * * * *